United States Patent [19]

Birkin

[11] 3,805,056

[45] Apr. 16, 1974

[54] VEHICLE PROGRAM CONTROL SYSTEMS

[75] Inventor: Michael S. Birkin, Derby, England

[73] Assignee: British Railways Board, London, England

[22] Filed: May 8, 1972

[21] Appl. No.: 250,996

[52] U.S. Cl....... 246/187 B, 179/100.2 S, 246/63 A
[51] Int. Cl............................................. B61l 3/02
[58] Field of Search ........ 246/182 R, 182 B, 182 C, 246/187 B, 63 A, 2 F; 180/79.1, 98; 318/567; 179/100.1 C, 100.2 S

[56] References Cited
UNITED STATES PATENTS

| | | | |
|---|---|---|---|
| 3,056,126 | 9/1962 | Preston | 246/2 F |
| 2,965,720 | 12/1960 | Bumstead et al. | 179/100.2 S |
| 2,928,180 | 3/1960 | Hirsch | 179/100.1 C |

FOREIGN PATENTS OR APPLICATIONS

| | | | |
|---|---|---|---|
| 923,915 | 4/1963 | Great Britain | 246/187 B |
| 1,247,371 | 8/1967 | Germany | 246/182 B |

Primary Examiner—Gerald M. Forlenza
Assistant Examiner—George H. Libman
Attorney, Agent, or Firm—George Vande Sande

[57] ABSTRACT

A vehicle control system for a vehicle moving along a trackway. The trackway is divided into a plurality of sequential sections, a program means such as a magnetic tape is carried by the vehicle and contains geographical information relating to the trackway and is arranged to transmit the information to control means to control the vehicle in dependence upon said geographical information. Location identifying means are provided at fixed locations in each of said trackway sections to transmit a signal containing the location identity of that section to the vehicle. Means are also provided on said vehicle to ensure that only geographical information corresponding to the particular location identity is passed to the control means.

6 Claims, 2 Drawing Figures

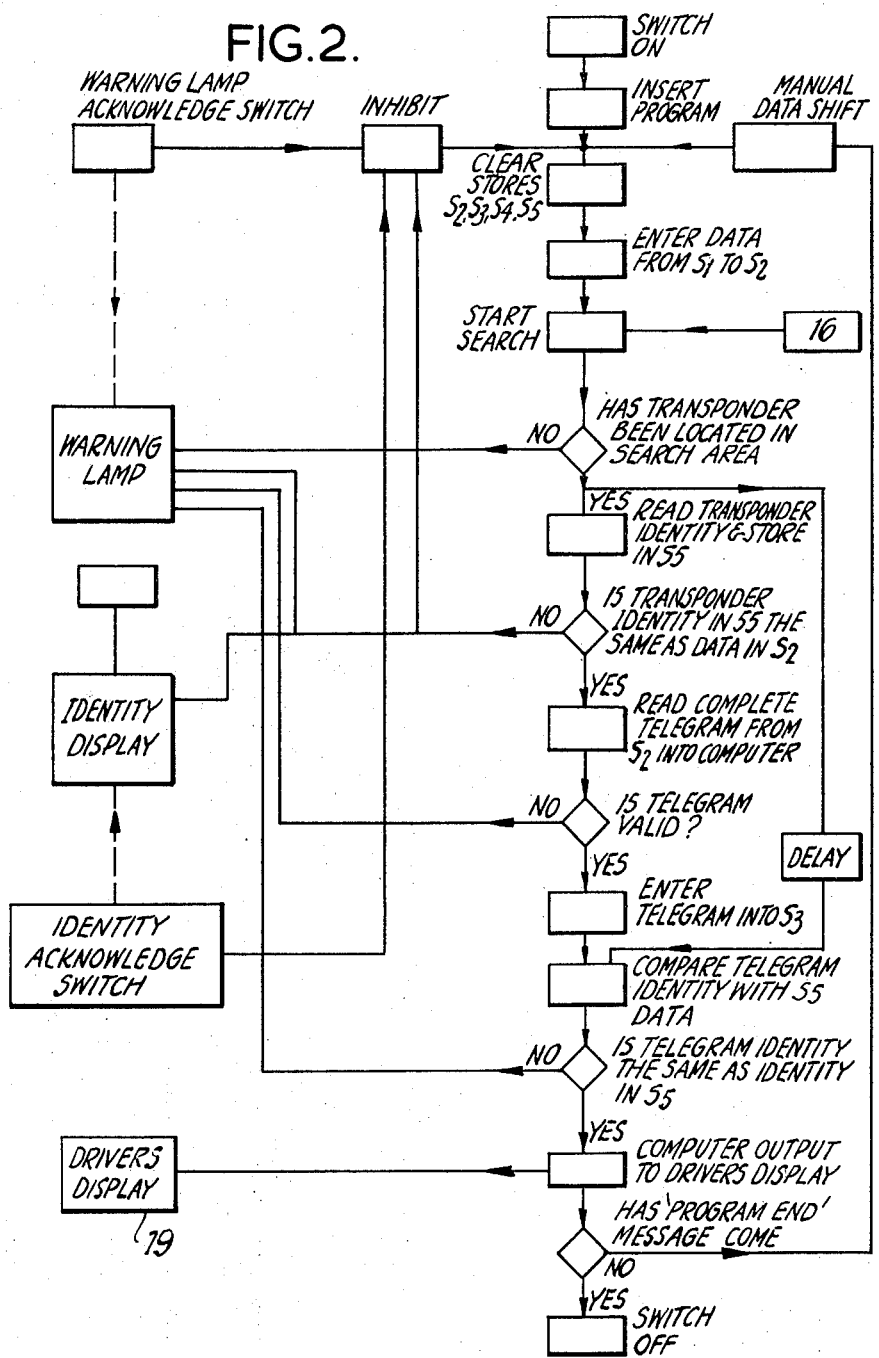

VEHICLE PROGRAM CONTROL SYSTEMS

The present invention relates to a control system for use of a vehicle moving along a fixed trackway and has particular, but not exclusive, application in railways.

Traditional methods of train control rely heavily on a train driver's route knowledge of speed restrictions and gradients. The present invention seeks to avoid the necessity of relying on this knowledge and instead a compact processing system is proposed, which can present speed and distance information to the driver. In this system the geographical details of the journey are stored on the train and the appropriate information is released from the store by synchronizing signals from the trackside along the route.

According to this invention there is provided a vehicle control system for a vehicle moving along a trackway, the trackway being divided into a plurality of sequential sections, program means carried by the vehicle and containing geographical information relating to the trackway and arranged to transmit said information to control means to control the vehicle in dependence upon said geographical information, location identifying means being provided at fixed locations in each of said trackway sections to transmit a signal containing the location identity of that section to said vehicle, means being provided on said vehicle to ensure that only the geographical information corresponding to the particular location identity is passed to the control means.

A preferred embodiment of the present invention will now be described with reference to the accompanying drawings in which:

FIG. 2 is a flow chart illustrating the sequence of operations of the system.

Figure 1:
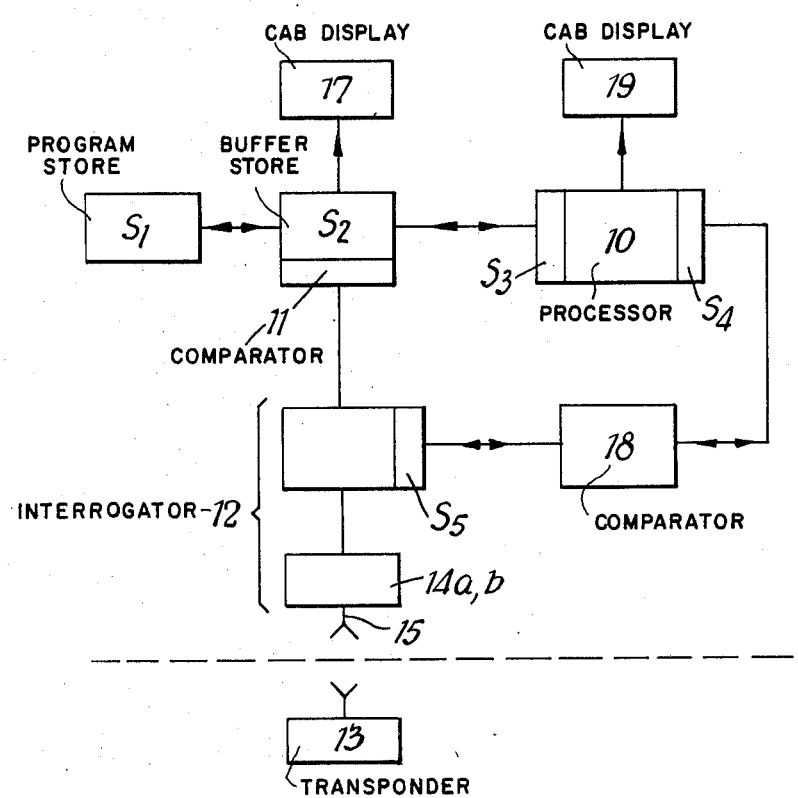
FIG. 1 is a block diagram of a vehicle control system

Geographical data relating to the particular route along which the vehicle is moving is coded into a digital form and is stored magnetically on a tape cassette. In its simplest form the data will be arranged in blocks sequentially on the tape. There will be a block of information describing each signal post on the journey, and as the train passes the signal post the store will be stepped on by one block of information, thus keeping step with the progress of the train on its journey. In order to check the synchronisation of the information, a signal is received from a transponder on the trackside at each signal post, which describes the location identity of the signal block section approaching. Only if this location identity is the same as the identity of the information currently in the store will the information be available to the processing equipment. Provision is made for the store to be stepped forward or backward manually by the driver if necessary.

As shown in FIG. 1, $S_1$ is a program store. This may be a paper tape or magnetic tape storage medium with a simple wind-on mechanism which is able to wind the tape forwards or backwards. A facility for fast forward wind and fast rewind may also be provided. A cassette loaded equipment is preferred to a spool loading type.

S2 is an intermediate Buffer Store. Data from S1 is transferred to S2 a block at a time for checking before use by a vehicle-borne processing equipment 10. There is a comparator 11 associated with the buffer store S2 which is used to compare the stored data in S2 with data derived from interrogator equipment 12 described below.

are a and S4 are buffer store and a main store of the vehicle-borne processing equipment 10. The equipment 10 will be used to process the data derived from the stored program unit S1.

A series of transponders 13 are positioned beside the track-way along which the vehicle passes. The transponders 13 may be passive devices, either buried in the ballast or mounted on a sleeper or fastened to the side of the rail. This device 13 receives a signal from a transmitter 14a mounted on the train. The received signal at the transponder is rectified, smoothed and used to power a message transmission circuit in the transponder 13. The digital coded message thus produced has a unique code corresponding to the signal location identity. The transmission from the transponder 13 is received by an antenna 15 and receiver 14b on the train. This system has the advantage that no external wiring or power supplies are needed on the trackside and the manufacturing and installation costs will be low. Alternatively, a transponder which acts as a selective reflector to microwave radiation may be used, the degree of reflection of power being dependent upon the frequency of the microwave radiation. Thus if the transmitting source on the train were to sweep in frequency, the return signal could be used to transmit a message which would depend upon the manner in which the degree of reflection was adjusted on the transponder.

When the interrogator equipment 12 has received the identity of the transponder 13, this identity is stored in store S5. A comparison is made in the comparator 11 with the identity of the telegram which has been used by the processing equipment for the speed profile calculation.

The system described is operated in the following sequential steps illustrated in FIG. 2 as follows:

The power is switched on and program is inserted. These actions cause the stores S2, S3, S4 and S5 to be cleared. The first data telegram in the program store S1 is read into intermediate buffer store S2. This data will remain in S2 until a further store-clear function occurs.

When the train passes over a signal device such as a permanent magnet positioned near the trackside, the resultant signal from an advanced warning receiver 16 is used to initiate a search for a transponder 13 which should be near the signal-post associated with that magnet. This search will continue for the time that the train takes to go a fixed distance e.g., 250 meters (distance information derived from the train tachometer). If no transponder 13 is found within this distance a warning is given to the driver. The driver must acknowledge this warning. His acknowledgement will cancel the warning, clear the stores S2, S3, S4, S5, and insert the next telegram from S1 into the buffer store S2 and the system will be ready to search for a transponder 13 when the next magnet is reached.

If a transponder 13 is located within the search distance, the transponder identity is read into the store S5 and is compared in comparator 11 with the transponder identity stored in S2. If the two do not agree a warning is given to the driver. An inhibit function is operated so that when the driver acknowledges his warning the stores S2–S5 will not clear. A display of the data stored in S2 is also given to the driver in a display unit 17 (FIG. 1). He can thus check his stored program position against the actual position of the train which can be determined by observation of the signal post numbers for example. If the program is out of synchronism it can be set forward or back to bring it to the correct position. The "Identity Acknowledge" switch cancels the identity display and clears the inhibit function which was previously initiated.

If the transponder identity compares correctly with the stored identity in S2, the telegram in S2 is read into the vehicle-borne processing equipment 10 and if it is parity checked it enters the processing equipment buffer store S3. If no correct telegram is found then the driver's warning is operated. He will acknowledge the warning and thus prime the system for a search at the next signal magnet.

The telegram in the processing equipment buffer store S3 is passed into the main store S4 an "end of section" pulse. This pulse is derived from the "Transponder located" function, delayed by a suitable number of milliseconds for the identity and parity checks to take place.

The location of telegram in S4 is compared to the transponder identity in S5 by a comparison circuit 18. If they do not compare then the driver's warning is operated. The driver's acknowledgement of this warning primes the system for a search at the next signal magnet.

If the telegrams in S4 and S5 are the same, the computed speed profile contained in the telegram stored in S4 is presented on a driver's display 19. Four levels of control are possible. The first is as just described in which the processing equipment 10 displays to the driver on display 19 a warning of the value of the appropriate speed at which the train should be travelling. The second level is an advisory control in which the actual speed of travel of the train is compared, in the processing equipment 10, with the maximum allowable speed for that particular stretch of track as derived from the program in the store S1. If this maximum allowable speed is exceeded, a warning is given to the driver.

The third level is an extension of the second level into a supervisory control level in which if the driver fails to comply with the excess speed warning by reducing the train speed within a specified time interval, then an automatic application of the brakes is made by equipment actuated by the processing equipment 10.

The fourth level of control is an auto-drive control level in which the speed of the train is directly controlled by the processing equipment to comply with the optimum speed derived from the stored program.

The incrementing of the stored program is continued by searching the telegram in S2 for an "end" message. If this is not found, the next data block or telegram is entered from the store S1 into the buffer store S2 and the system is primed for a search at the next signal magnet.

As an alternative to having the blocks of data stored in S1 in the order in which they are to be used, it is possible to have a system in which these blocks of geographical data, each with its location identity, are arranged randomly in the store, which is cycled continuously. On receipt of a location identity from a trackside transponder 13, the store S1 cycles until it reaches a data block having the same location identity. The geographical information is then presented to the processing equipment as described. This system, although requiring more complicated storage arrangements has the advantage that route diversions can easily be accommodated and it would even be possible to include information on a number of different routes in a region thus allowing the train to be used on any of these without having to change the contents of the store S1.

I claim:

1. Vehicle control apparatus for a vehicle moving along a trackway divided into a plurality of sequential sections comprising, program means carried by the vehicle and containing geographical information relating to the trackway, means for selectively transferring said information from said program means to control means to control the vehicle in dependence upon said geographical information, location identifying means being provided at fixed locations in each of said trackway sections to transmit a distinctive signal containing the location identity of that section to said vehicle, and means provided on said vehicle to ensure that only geographical information corresponding to the particular location identity is passed to the control means, said last-named means including comparator means for comparing the signal from said location identifying means with the location identity of the geographical data derived from said program means, said comparator only allowing the data from the program means to pass to said control means if the two location identities are the same.

2. Vehicle control apparatus as claimed in claim 1, wherein said location identifying means comprises a transponder, said apparatus further including an interrogating transmitter on said vehicle for actuating said transponder to transmit information identifying its geographical location to a receiver on said vehicle.

3. Vehicle control apparatus as claimed in claim 1 in which said program means comprises a tape which carries the geographical information in the form of discrete blocks of data each of which includes a part containing the location identity of the block.

4. Vehicle control apparatus as claimed in claim 3 which further includes means for reading each of said data blocks in turn from said tape and for transferring each to a buffer store, and means for subsequently transferring each said data block to a store associated with said control means only if its location identity corresponds to the actual location identified by the location identifying means.

5. Vehicle control apparatus as claimed in claim 1 wherein the said control means includes means responsive to said program means for indicating to the driver the appropriate speed at which the vehicle should be travelling.

6. Vehicle control apparatus as claimed in claim 5 wherein said control means includes means for reducing the speed of the vehicle if the driver fails to take the appropriate action to reduce the speed when the vehicle is travelling faster than the appropriate speed.

* * * * *

UNITED STATES PATENT OFFICE
CERTIFICATE OF CORRECTION

Patent No. 3,805,056                    Dated April 16, 1974

Inventor(s) MICHAEL S. BIRKIN

It is certified that error appears in the above-identified patent and that said Letters Patent are hereby corrected as shown below:

Foreign Application Priority Data

May 14, 1971   Great Britain. . . . . . . . . 15039/71

Signed and sealed this 30th day of July 1974.

(SEAL)
Attest:

McCOY M. GIBSON, JR.              C. MARSHALL DANN
Attesting Officer                 Commissioner of Patents